June 6, 1933.     R. L. STEELE, 3D     1,912,550
LINING FOR FRUIT BASKETS
Filed Aug. 19, 1931
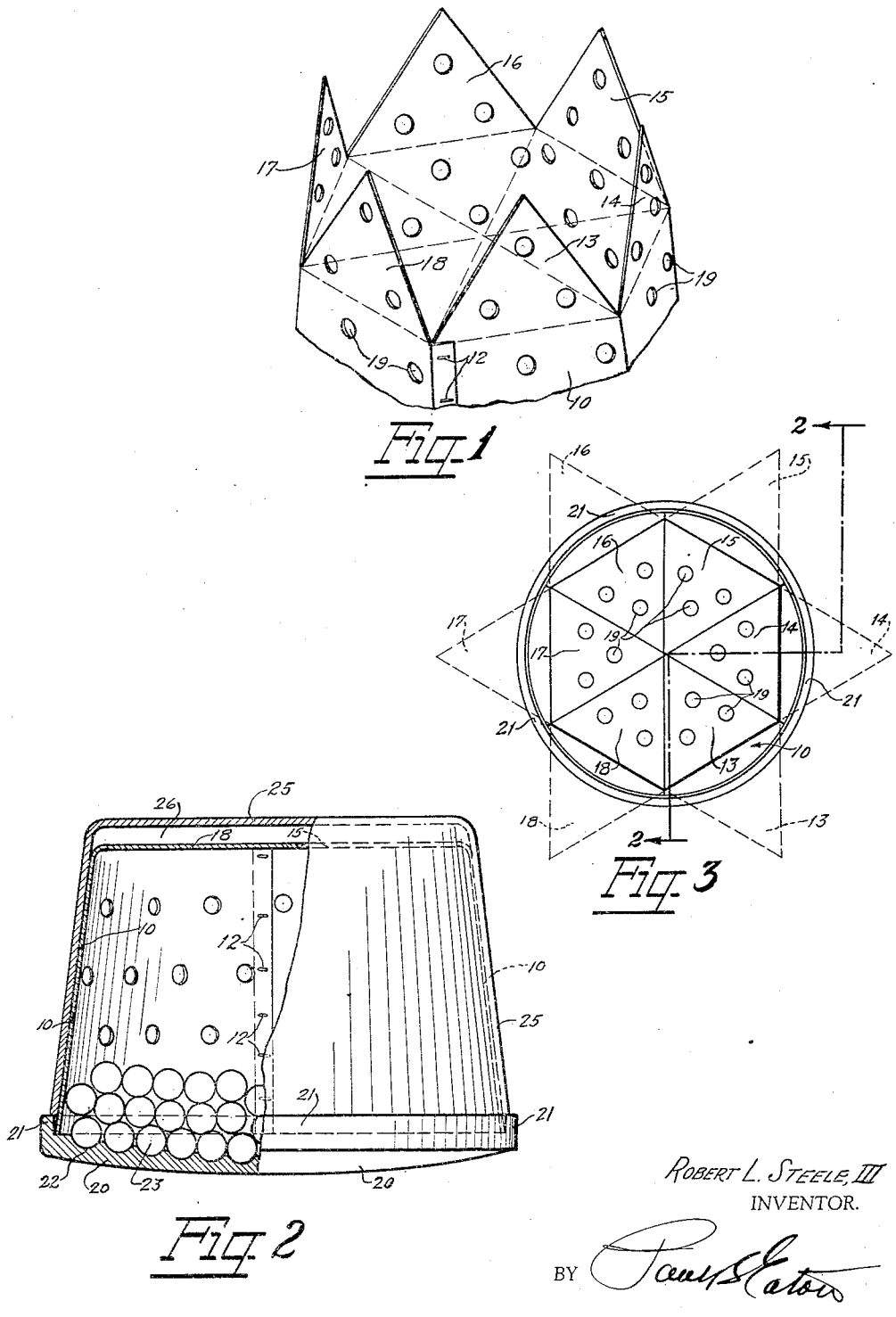
ROBERT L. STEELE, III
INVENTOR.
BY *Paul S Eaton*
ATTORNEY.

Patented June 6, 1933

1,912,550

UNITED STATES PATENT OFFICE

ROBERT L. STEELE, 3D, OF ROCKINGHAM, NORTH CAROLINA

LINING FOR FRUIT BASKETS

Application filed August 19, 1931. Serial No. 557,964.

This invention relates to a lining for fruit baskets and the like which comprises a lining member having the wall portion and the bottom portion integral, the bottom being formed of a plurality of flaps extending from the sidewall portion so that when the flaps are folded in position, a bottom member is formed for the lining member for the fruit basket for shipping the fruit.

Heretofore, lining members have been provided for fruit baskets in which the sidewall members and the bottom members are separate from each other, resulting in a loss of time in the packing operation and also causing various inconveniences such as the exhaustion of supply of bottom members and thus stopping the packing operation at a time when the fruit must be packed in great quantities, but by providing the bottom member and sidewall in one piece, it is evident that a complete lining member is provided, not only for the sidewall portions of the basket, but also for the bottom thereof.

It is an object of this invention, therefore, to provide a lining member for fruit baskets comprising a sidewall portion and bottom portion made integral with each other, with the bottom portion being in the form of a plurality of foldable members adapted to be opened outwardly during the packing operation and to be folded inwardly to form a bottom member after the packing operation has been completed and before the basket is inserted over the lining member.

Some of the objects of the invention having been stated, other objects will appear as the description proceeds when taken in connection with the accompanying drawing, showing a preferred embodiment of the invention, in which—

Figure 1 is a perspective view of the upper portion of my lining member and showing the bottom portion partially unfolded;

Figure 2 is a view partly in elevation and partly in cross section and taken along the line 2—2 in Figure 3 with the basket omitted in Figure 3;

Figure 3 is a top plan view of the lining member with the bottom in folded position and before the fruit basket is slipped thereover.

Referring more specifically to the drawing, the lining member comprises a strip of material 10 which is joined as at 11 to form a continuous lining member for protecting the fruit from the sidewalls of the basket during the shipping operation. The portion 10 has, in the form shown, six triangular shaped flaps or tabs integral therewith and indicated by reference characters 13, 14, 15, 16, 17 and 18.

The flaps, as well as the sidewall portions, have a plurality of perforations 19 therein for ventilation purposes.

In Figure 2 a conventional ringer 20 is shown having the rim portion 21 and a plurality of circular grooves 22 for reception of the fruit 23 to arrange it in rings within the lining member 10 which is placed within the circular rim portion 21 and the flaps 13 to 18 are folded outwardly according to the dotted line position shown in Figure 3 and the fruit is packed therein and after the fruit is packed therein the flaps 13 to 18 inclusive are folded to the position shown in Figure 3, and then the basket 25 is slipped over the lining member containing the fruit to the position shown in Figure 2 and the entire basket, lining member, fruit, and ringer are turned over to an inverted position from that shown in Figure 2 which causes the fruit and the lining member to sink downwardly into the basket to fill up the space 26 as shown in Figure 2 and in this position, the conventional lid is secured on the basket and the entire package is ready for shipping.

The advantage of this arrangement is that it permits the lining member to be integral with the flaps and said flaps being capable of being folded outwardly for the packing operation and being folded inwardly to the position shown in Figure 3 for the placing of the shipping basket thereover.

It is true that the drawing shows the upper portion of the lining member hexagonal in shape but it is evident that the lower portion of the lining member will be circular and when the entire liner is packed full of fruit, the straight sidewall portion as appearing in Figure 3 will bulge outwardly to cause the upper portion of the lining member to fit against the inside of the basket.

In the drawing and specification, there has been set forth a preferred embodiment of the invention and although specific terms are employed they are used in a generic and descriptive sense only and not for purposes of limitation, the scope of the invention being set forth in the appended claim.

I claim:

In a liner for fruit baskets, and the like consisting of a weak endless wall, said wall initially possessing sufficient strength to hold the fruit without any outside support but of sufficient weakness to render it capable of yielding to compensate for irregularities in the sidewalls of the basket, said liner having one end open and a closed end of less dimensions than the open end, the closure means for said closed end comprising a plurality of triangular portions having one side thereof integral with the liner, the open end of the liner being adapted to rest on a ringer during the packing operation and the triangular portions being spread apart during the packing operation, said triangular portions being foldable over the fruit to form a bottom for the liner when an inverted shipping basket is placed over the liner, the base of each triangular portion in association with the sidewall to which it is joined serving to form a pocket between the sidewall and the basket to resiliently support the contents of the basket.

In testimony whereof I affix my signature.

ROBERT L. STEELE, III.